Nov. 6, 1962        G. G. EDLEN ETAL        3,062,938
THERMOSTATIC CONTROL FOR FANS
Filed Oct. 10, 1958

INVENTORS
George G. Edlen
Leo G. Dumire

BY

ATTORNEY

3,062,938
THERMOSTATIC CONTROL FOR FANS
George G. Edlen, Silver Spring, and Leo G. Dumire, Kensington, Md., assignors to William D. Hall, Washington, D.C.
Filed Oct. 10, 1958, Ser. No. 766,507
5 Claims. (Cl. 200—138)

This invention relates to a thermostatic device adapted to be attached to the grill of an electric fan, and which will control the fan.

It is well known that an electric fan may have a thermostat for controlling the same and it has also been heretofore known that the thermostat could be in the form of a bimetallic strip enclosed in a casing, which casing is adapted to be readily attached to the grill of a fan. The present inevntion relates to this type of apparatus and provides improvements therein, especially in the means of attachment.

When a thermostatic control is sold separate from the fan but is arranged to be attached thereto, the problem arises of providing a construction which has a universal attachment, that is one that can be attached to the grill of practically any fan. The object of the present invention is to provide such an arrangement.

In one specific form of the invention the thermostatic control includes a casing and also suitable bimetallic means in the casing for operating switch contacts. This bimetalilc means may be of a well known commercial construction which employs several elongated strips, at least one of which is of bimetal, which are secured together at one end by an eyelet. There is a control rod for adjusting the temperature at which the bimetal will operate the switch contacts and which passes through the front of the casing and is operated by a knob. In addition, there is in the casing an element having a threaded hollow cylindrical hole therein. This element projects out the front of the casing where it has a screwdriver slot therein whereby it may be rotated. This element passes through the hole in said eyelet and engages the longer portion of a J-shaped element, said portion being threaded and arranged to mate with the threads of said cylinder. As a result, the hook of the J-shaped member may be placed over a grill rod of the fan and thereafter the screwdriver inserted in said screwdriver slot. Rotating the screwdriver will cause said mating threads to pull the hook of the J-shaped member toward the rear of the casing and clamp the rear side of the casing solidly against the grill rods of the fan. This arrangement permits the device to be attached solidly to the grill of almost any fan.

Figure 1:
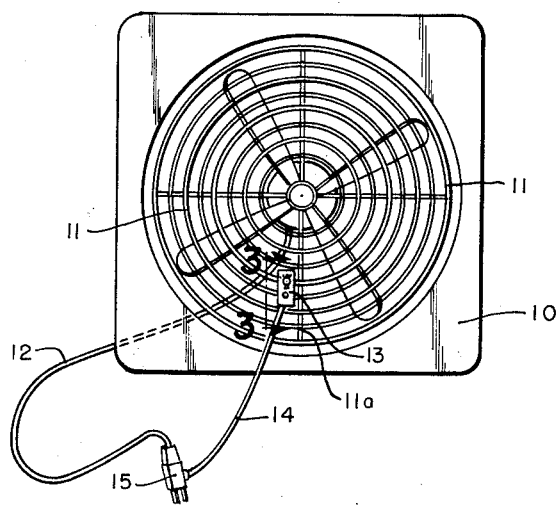
FIGURE 1 is a front view of a suitable electric fan having the thermostatic control mounted thereon.

In FIGURE 1 the electric fan 10 has a front grill 11 and an electric supply cord 12. If desired, the thermostatic control 13 (constituting this invention) may be applied to the fan in which event it will be fed by electric cord 14 from series plug 15. The plug on the end of cord 12 is arranged to be plugged into the plug 15 and when this is done the thermostatic control 13 is in series with the fan motor.

Figure 3:
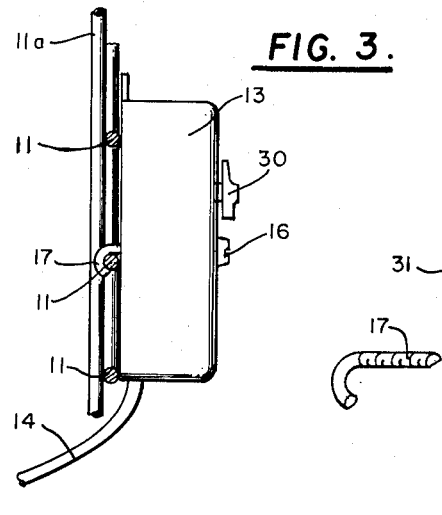
FIGURE 3 is a side view of the casing and one grill rod of the fan.

The grill of the fan may have vertical grill rods, horizontal grill rods, a combination of both, or a combination of horizontal and vertical rods with circular rods as shown. In the present case the vertical rod 11a appears in FIGURES 1 and 3. In some cases the grill is composed of metal rods, in other cases plastic strips up to ½ inch wide (the face of the strip being parallel to the direction of air flow), or otherwise. The present invention has been found to have universal application to practically any grill of any electric fan.

Figure 2:
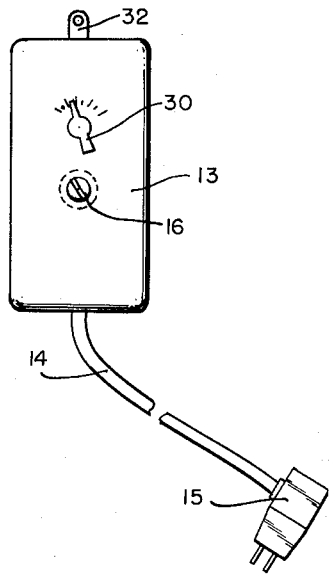
FIGURE 2 is a front view of the casing and electric cord of the thermostatic control.
Figure 4:
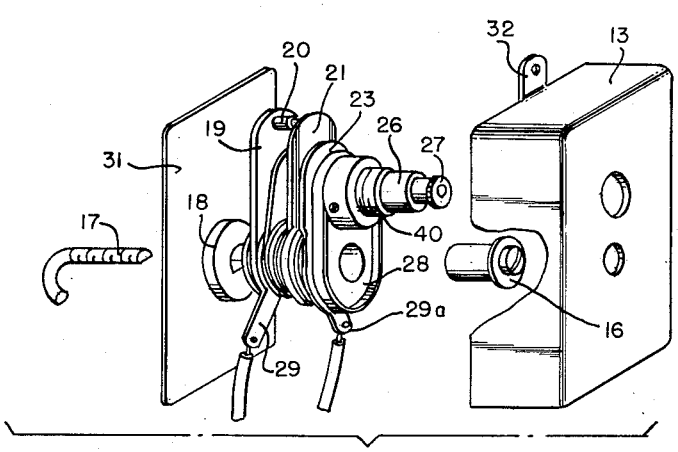
FIGURE 4 is a perspective view of the thermostatic control.
Figure 5:
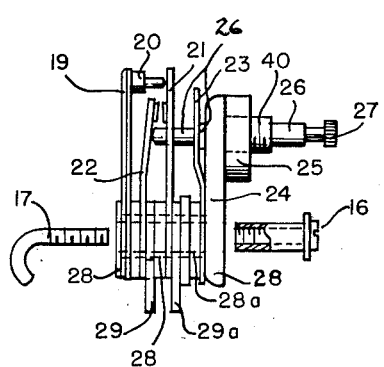
FIGURE 5 is a side view, partially in section, of the bimetallic strip, the switch element, the J-shaped member, etc.

Referring to FIGURES 4 and 5, a bimetallic strip 19 is mounted at its lower end upon eyelet 28, hence its upper end tends to move toward the right when the temperature drops. This causes member 20 to press against spring resilient switch blade 21 and move it away from resilient switch blade 22 and break the contact between 21 and 22 and thus break connection between lugs 29 and 29a which respectively are in turn connected to the two wires of cord 14 which pass to the series plug 15. The temperature setting is adjusted by rotating knob 30 which is affixed to head 27 of a rod 26 which passes into the stationary boss 40. The rod 26 has external threads on that portion thereof within boss 40 which in turn has internal mating threads. As a result, rotation of the head 27 causes its rod 26 to have lateral motion. The rear end of this rod engages resilient blade 22 and adjusts its position with reference to blade 21 to thus control the temperature at which the bimetallic strip 19 will move the spring element 21 away from contact with element 22. Except for the parts 16 and 17, the thermostatic control of FIGURE 5 is an extremely common commercial article used in large quantities for various temperature controlling applications. It is mounted by attaching the boss 40 to the casing 13, as for example, by a nut on the front of the casing which passes around the threaded boss part 40. The threaded boss part 40, and eyelet 28 are rigidly attached together and are therefore integral. The bimetallic strip 19, the blades 21 and 22, and the spring element 23 are held in place by virtue of the eyelet 28 at the lower part of the device, the eyelet having an internal opening 28a. A cylindrical member 16 having a screw driver slot on the front thereof is inserted through a hole in the front of the casing so that the flange on the member is within the casing and the screwdriver slot extends through a hole in the front of the casing. This member has a hollow threaded cylindrical hole therein, the threads of which mate with the threads on the J-shaped member 17. The longer arm of the member 17 is not round, but rather its lower part is flattened and this longer arm of the J-shaped member 17 passes through a hole (of the same shape as the cross section of member 17) in member 18 which is rigidly mounted on the back side 31 of the casing. In order to assemble the device to the condition in which it would be sold in commerce (as shown in FIGURE 2) the control unit 19—28 is mounted on the casing 13 as for example by passing boss 40 through the hole in the front of the casing and placing a nut on the front of the casing in engagement with boss 40 and adding the knob 30 over the part 27. The backslide 31 of the casing is then securely fastened to the casing 13 by any suitable attaching means, including soldering, bolting or otherwise. The member 17 is then slipped in through the rear of the unit and the threads of the members 16 and 17 caused to mate whereby as the member 16 is rotated engagement of the threads will take place that will hold the J-shaped member 17 in place during shipping, etc. The spring plate 23 presses against rod 26 to hold the rod 26 in any position of adjustment in which it is placed by knob 30.

All the customer need do to apply the device to the grill of the fan is to place the backside 31 of the casing against the grill of the fan with the hook of the J-shaped member 17 hooked over one of the grill rods. With a screwdriver he then tightens the threaded member 16 while the flange thereof bears against eyelet 28, until the J-shaped member presses the rear end of the casing against the grill work solidly.

After the device has been installed as aforesaid, the casing cannot vibrate independently of the fan, and moreover the device will not work loose from the fan but will remain solidly attached thereto indefinitely.

If desired, a member 32 with a hole therein may be included so that if it is desired to hang a device on a wall, instead of mounting on the grill of the fan, such may be done. In this case the member 16 is rotated counterclockwise until member 17 becomes detached from the device and may therefore be conveniently removed.

After the casing 13 is mounted on the grill of a fan, or on the wall, the plug at the end of cord 12 of the fan is plugged into the female opening of the series wall plug 15. As a result the fan motor is placed in series with switch blades 21 and 22, whereby the latter controls the fan.

We claim:

1. A thermostatic control device adapted for attachment to an electric appliance having a grill that is made up of a plurality of rods comprising a temperature sensitive switch, means for connecting said switch in series with an electric appliance, a casing enclosing said switch, said casing having front and rear sides, a control knob mounted on the front side of said casing, means connecting the control knob to the switch to adjust the temperature setting of the latter, said switch including a bimetallic strip and at least one switch blade, means fastening said strip and switch blade together and having a hole therethrough, a member that extends rearward of the casing and has a portion spaced from the casing adapted to hook behind a rod of the grill, and a second member cooperating with said first member and the casing for moving the member forwardly to press said portion against one of the rods of the grill and in turn clamp the casing tightly against the grill and thereby hold the casing in place, at least one of said members extending into said hole and the two members considered together passing through the hole.

2. A thermostatic control device as defined in claim 1 in which said first member is threaded and in which the second member includes a threaded portion that mates with the threads of the first member to move the first member forwardly to thus cause the member and casing to tightly grip a rod of the grill.

3. A thermostatic control device as defined in claim 1 in which said first member is a J-shaped member and in which said portion is the hook of the J-shaped member, the longer arm of the J-shaped member extending perpendicularly to the rear face of the casing and including threads thereon, the second member constituting a threaded device mating with the J-shaped member and rotatable to move the J-shaped member.

4. A thermostatic control device adapted for attachment to an electric fan having a grill that is made up of a plurality of rods comprising a temperature sensitive switch which opens the circuit therethrough in response to a drop in temperature, said switch including a bimetallic strip and a plurality of switch blades, an eyelet connecting said strip and blades together at one end, a casing enclosing said switch and supporting the same, said casing having front and rear sides, a control knob mounted on the front side of said casing for adjusting the temperature setting of said temperature sensitive switch, means for connecting said switch in series with an electric fan, a J-shaped member having the hook portion thereof extending out of the rear of the casing and having the longer arm thereof extending through the hole in said eyelet, and a threaded member extending from the front side of the casing into the eyelet and including threads for engaging those of the J-shaped member, whereby when the threaded member is rotated the hook will move toward the casing and cause any grill rod which has been engaged by the hook to be tightly gripped by the hook and the casing.

5. A thermostatic control device adapted for attachment to a grill comprising a temperature sensitive switch including a supporting structure therefor, said switch including a bimetallic strip and a plurality of switch blades held together as a unit by said structure, a casing enclosing and supporting said switch, said casing having front and rear sides, a control knob mounted on the front side of the casing for adjusting the temperature setting of said switch, means for connecting said switch to a device to be controlled, a J-shaped member having the hook portion extending out of the rear of the casing, the straight portion of the J-shaped member extending into the casing transverse to the rear side thereof and being threaded, and a threaded member extending out of the front of the casing, mating with the threads on the J-shaped member and restrained against rearward movement by said supporting structure for moving the hook of the J-shaped member forward to thereby clamp the rear side of the casing against the grill.

References Cited in the file of this patent

UNITED STATES PATENTS

| | | |
|---|---|---|
| 817,048 | Davis | Apr. 3, 1906 |
| 1,059,579 | Tobey | Apr. 22, 1913 |
| 1,356,774 | Lanchester | Oct. 26, 1920 |
| 1,655,444 | Tiritter | Jan. 10, 1928 |
| 2,047,708 | Rennekamp | July 14, 1936 |
| 2,095,434 | Calkins et al. | Oct. 12, 1937 |
| 2,235,697 | Cornell | Mar. 18, 1941 |
| 2,251,989 | Dean | Aug. 12, 1941 |
| 2,255,508 | Hall | Sept. 9, 1941 |
| 2,300,418 | Hall | Nov. 3, 1942 |
| 2,411,421 | Golden | Nov. 19, 1946 |
| 2,480,827 | Armstrong | Sept. 6, 1949 |
| 2,660,108 | Baer | Nov. 24, 1953 |
| 2,731,529 | Leins | Jan. 17, 1956 |
| 2,944,168 | Hall | July 5, 1960 |